United States Patent
Prakash et al.

(10) Patent No.: US 10,143,000 B2
(45) Date of Patent: Nov. 27, 2018

(54) PRIORITIZED ASSOCIATION BETWEEN CHILD DEVICES AND PARENT DEVICES OPERATING ON A TIME-SLOTTED CHANNEL HOPPING NETWORK

(71) Applicant: Landis+Gyr Innovations, Inc., Alpharetta, GA (US)

(72) Inventors: Vidya Prakash, Alpharetta, GA (US); Saurabh Jain, Ghaziabad (IN)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 15/375,916

(22) Filed: Dec. 12, 2016

(65) Prior Publication Data
US 2018/0167955 A1    Jun. 14, 2018

(51) Int. Cl.
| H04W 72/10 | (2009.01) |
| H04W 48/16 | (2009.01) |
| H04W 48/20 | (2009.01) |
| H04W 52/02 | (2009.01) |
| H04W 40/02 | (2009.01) |

(Continued)

(52) U.S. Cl.
CPC ........... *H04W 72/10* (2013.01); *H04W 8/005* (2013.01); *H04W 40/02* (2013.01); *H04W 48/16* (2013.01); *H04W 48/20* (2013.01); *H04W 52/0261* (2013.01); *H04W 72/0446* (2013.01); *H04W 48/00* (2013.01); *H04W 48/14* (2013.01); *H04W 48/17* (2013.01); *H04W 84/20* (2013.01)

(58) Field of Classification Search
CPC ..... H04W 72/10; H04W 76/10; H04W 76/15; H04W 40/02; H04W 48/16; H04W 48/20; H04W 52/0261; H04W 84/20; H04W 72/0446

See application file for complete search history.

(56) References Cited

U.S. PATENT DOCUMENTS

| 6,665,303 B1 | 12/2003 | Saito et al. |
| 7,539,175 B2 | 5/2009 | White et al. |

(Continued)

FOREIGN PATENT DOCUMENTS

| CN | 104039020 | 9/2014 |
| EP | 2503298 | 9/2012 |
| WO | 2016153557 | 9/2016 |

OTHER PUBLICATIONS

U.S. Appl. No. 14/830,271, Non-Final Office Action dated Apr. 24, 2017, 17 Pages.
U.S. Appl. No. 14/830,271, "Notice of Allowance", dated Jul. 31, 2017, 8 pages.
International Application No. PCT/US2015/057325, International Search Report and Written Opinion dated Jan. 13, 2016, 13 pages.

(Continued)

*Primary Examiner* — Warner Wong
(74) *Attorney, Agent, or Firm* — Kilpatrick Townsend & Stockton LLP

(57) ABSTRACT

Systems and methods are disclosed for prioritized associations between parent nodes operating on a time-slotted channel hopping (TSCH) network and child nodes installed in one or more home area networks. Upon initialization and bootup, a child node scans for one or more available parent nodes on the TSCH network. If there are less than a threshold number of available parent nodes within communication range of the child node, the child node transmits a prioritized association request to the parent node. The parent node supports prioritized association requests by reserving at least one connection slot for child nodes requesting prioritized association.

22 Claims, 7 Drawing Sheets

(51) Int. Cl.
  *H04W 72/04* (2009.01)
  *H04W 8/00* (2009.01)
  *H04W 84/20* (2009.01)
  *H04W 48/00* (2009.01)
  *H04W 48/14* (2009.01)

(56) References Cited

U.S. PATENT DOCUMENTS

| | | |
|---|---|---|
| 7,991,351 B2 | 8/2011 | Kuban |
| 8,055,802 B2 | 11/2011 | Choi et al. |
| 8,149,095 B2 | 4/2012 | Hayashi et al. |
| 8,176,112 B2 | 5/2012 | Hicks et al. |
| 8,374,212 B2 | 2/2013 | Charbit et al. |
| 8,554,137 B2 | 10/2013 | Wyper et al. |
| 8,606,182 B2 | 12/2013 | Wyper et al. |
| 8,942,102 B2 | 1/2015 | Edge et al. |
| 9,100,108 B2 | 8/2015 | Prajapati et al. |
| 9,172,510 B2 | 10/2015 | Chakravarthy et al. |
| 9,295,075 B2 | 3/2016 | Wyper et al. |
| 9,467,449 B2 | 10/2016 | Defrance et al. |
| 9,516,698 B2 | 12/2016 | Schmandt et al. |
| 9,537,642 B2 | 1/2017 | Belghoul et al. |
| 9,825,748 B2 | 11/2017 | Liang et al. |
| 9,853,797 B2 | 12/2017 | Tabet et al. |
| 2007/0032219 A1* | 2/2007 | Rudolf .................. H04W 4/22 455/404.1 |
| 2008/0040509 A1 | 2/2008 | Werb et al. |
| 2009/0168717 A1* | 7/2009 | Ali .................. H04W 28/16 370/329 |
| 2012/0163275 A1* | 6/2012 | Kim .................. G08G 1/092 370/312 |
| 2013/0242836 A1* | 9/2013 | Vaidya .................. G06F 1/3203 370/311 |
| 2013/0243038 A1 | 9/2013 | Rasband et al. |
| 2013/0272260 A1 | 10/2013 | Bitran et al. |
| 2013/0279427 A1* | 10/2013 | Wentink .............. H04W 74/002 370/329 |
| 2014/0044106 A1 | 2/2014 | Bhagwat |
| 2015/0223115 A1 | 8/2015 | Liang et al. |
| 2016/0198344 A1* | 7/2016 | Oba .................. H04W 12/06 455/411 |
| 2016/0277206 A1 | 9/2016 | Calvert et al. |
| 2016/0278079 A1* | 9/2016 | Xhafa .................. H04W 4/70 |
| 2016/0302179 A1* | 10/2016 | Gupta .................. H04W 72/044 |
| 2016/0353378 A1* | 12/2016 | Kim .................. H04W 74/06 |
| 2016/0360470 A1* | 12/2016 | Roberts .................. H04W 48/10 |
| 2017/0027003 A1* | 1/2017 | Kojima .................. H04W 28/065 |
| 2017/0055278 A1 | 2/2017 | Jechoux et al. |
| 2017/0227961 A1* | 8/2017 | Baroudi .................. G05D 1/0287 |
| 2017/0311360 A1* | 10/2017 | Singh .................. H04L 5/0055 |
| 2017/0324443 A1 | 11/2017 | Turner |
| 2017/0366369 A1 | 12/2017 | Calvert et al. |
| 2018/0054250 A1* | 2/2018 | Zhang .................. H04W 52/0229 |

OTHER PUBLICATIONS

Rhee et al., OSIA Standards & Technology Review Journal, vol. 2, No. 3 URL:http://www.google.nl/urlsa=t&rct=j&q=&esrc=s&frm=1&source=web&cd=1&ved=OCCkQFjAA&url=http%3A%2F%2Fwww.osia.or.kr%2Fboard%2Finclue%2Fdownload.php%3Fno%3D76%26db%3DSntr%26fileno3D1&ei=242AUo34lpCXhQe6q4D4CA&usg=AFQjCNEH4dVO, Sep. 2010, pp. 1-58.

U.S. Appl. No. 15/697,801, "Notice of Allowance", dated Apr. 25, 2018, 11 pages.

International Patent Application No. PCT/US2017/063631, "International Search Report and Written Opinion", dated Mar. 1, 2018, 15 pages.

* cited by examiner

PRIORITIZED ASSOCIATION BETWEEN CHILD DEVICES AND PARENT DEVICES OPERATING ON A TIME-SLOTTED CHANNEL HOPPING NETWORK

TECHNICAL FIELD

This disclosure relates generally to networking and more particularly relates to a mechanism for prioritized association between child devices and parent devices operating in a time slotted channel hopping IEEE 802.15.4 or IEEE 802.15.4e network.

BACKGROUND

Systems and methods are provided for establishing prioritized association between child devices and parent devices operating in a time slotted channel hopping (TSCH) network. Utility companies, home automation providers, industrial automation providers, scientific and environmental application providers, and other resource providers may communicate with endpoints via devices operating on a TSCH network, such as those defined by IEEE 802.15.4 and IEEE 802.15.4(e). Parent devices (e.g., electric meters, routers) are connected via a TSCH network. Parent devices are also referred to herein as parent nodes or TSCH nodes. Child devices are endpoint nodes that are used to monitor and/or manage consumption of resources (e.g., electricity, heat, water, other utilities, as well as other types of resources). In some aspects, child devices (also referred to herein as "child nodes") can be Internet-Of-Things (IoT) enabled devices that can be used in smart power grid and smart home technologies. Child devices are utilized as endpoints in TSCH networks and communicate messages on power consumption readings and other resource information with the parent devices. In other aspects, child devices can be mobile devices that are passing through the coverage area for one or more parent devices in the TSCH network.

Parent devices operating on an IEEE 802.15.4 network can support a limited number of child devices. Once the maximum number of child devices have joined/associated with a parent device, the parent device can no longer accept any additional child devices. There is a need for prioritized association between parent devices and child devices joining the network and requiring priority access to the TSCH network.

SUMMARY

Systems and methods are disclosed for establishing prioritized associations between parent nodes operating on a time-slotted channel hopping (TSCH) network and child nodes. The child nodes may be implemented in a home area network or other local network for providing resource monitoring services to a resource provider via the TSCH network. Upon initialization and boot up, a child node scans for available parent nodes on the TSCH network. Based on hardware and network characteristics and limitations, parent nodes are able to support a limited number of child nodes at a time. Available parent nodes refer to parent nodes that are capable of supporting at least one additional child node. The child node determines whether to transmit an association request with priority depending on the number of available parent nodes detected by the scan. If the child node determines that there is a low number (i.e. less than a threshold number that is configurable by a network administrator) of available parent nodes, the child node inserts a priority request with the association request. The priority request may be added by enabling a priority bit within the data packet transmitted for the association request. If the child node determines that there is greater than a threshold number of parent nodes, the child node does not include a priority request.

The priority request may also include a duration request for the priority for short-term priority or long-term priority. Short-term priority allows the child node to associate with the parent node for a duration of time sufficient to complete a communication event. For example, short-term priority allows the child node to associate with a parent node to transmit a resource consumption/utilization message to the parent node and upon completion of the transmission disassociate from the parent node. The child node may request prioritized association for a short-term duration if the child node determines that the TSCH network is in an initialization state or the child node is running out of power supply. Long-term priority allows the child node to associate with the parent node for as long as the parent node is operational. The child node may request prioritized association for a long-term duration if the child node determines that the TSCH network is in a mature state.

The TSCH parent nodes are configured to accommodate prioritized association requests by reserving one or more slots for child nodes with prioritized association requests. The TSCH parent node maintains in memory a record of child nodes limited in number based on the hardware and networking capabilities of the TSCH parent node. The TSCH parent node reserves one or more of the entries for child nodes requesting prioritized association requests. In other embodiments, TSCH parent node may choose to disassociate one of its associated child nodes to accommodate prioritized association request from another child node. For example, dissociation can be decided based on least communicative radio or signal strength of another child node. The TSCH parent node can maintain statistics and information of connected child nodes (e.g., whether or not a child node connected via prioritized association), and may choose to disassociate a child node that did not previously request prioritized association.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
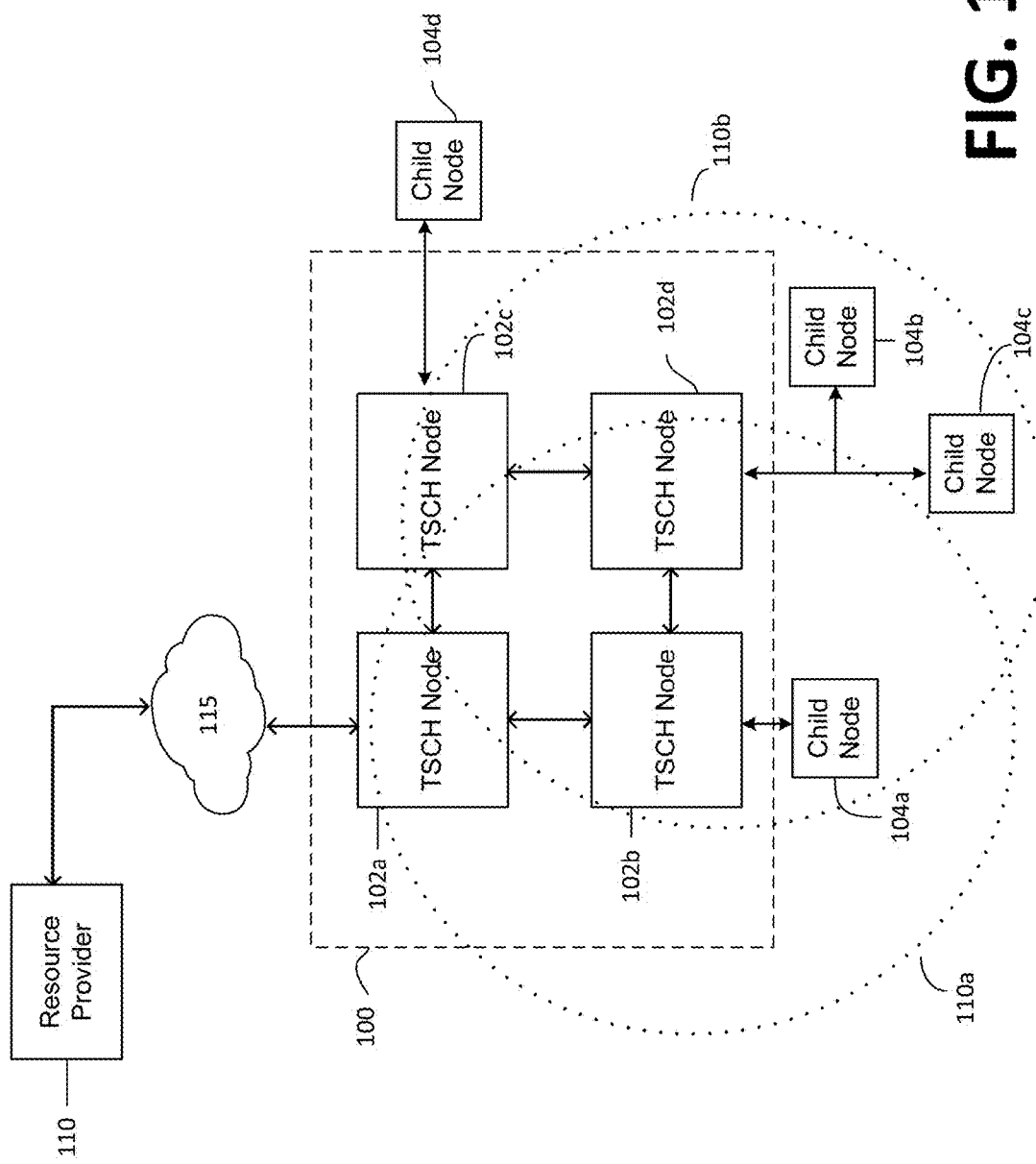
FIG. 1 is a network diagram illustrating example computing devices for prioritized association between parent nodes operating on a time-slotted channel hopping (TSCH) network and child nodes.

Systems and methods are provided for establishing prioritized association between child nodes and parent nodes operating on a time-slotted channel hopping (TSCH) network. The TSCH network includes, for example, multiple TSCH devices in a mesh network that provide communications with a central system, such as a resource provider system. The TSCH devices communicate using the TSCH protocol, defined by IEEE 802.15.4. By communicating using a TSCH protocol, nodes within the TSCH network transmit and receive signals using a series of time slots according to a scheduled frequency channel hopping pattern. Parent nodes are TSCH devices that manage and support one or more child nodes. For example, child nodes may be endpoint devices installed in a home area network and used to manage and/or monitor the consumption and use of resources within the home area network. The child nodes can thus report on the resource use to the resource provider system via the TSCH network. In other aspects, child nodes may be mobile devices within communication range of one or more parent nodes of the TSCH network and may need to temporarily connect to the TSCH network for short-term communication.

In some instances, a child node may require prioritized access to a parent node in the TSCH network. For example, in some aspects a child node may determine that it needs prioritized access depending on the number of available parent nodes found by the child node during a network scan. This is because a limited number of available parent nodes may indicate that the TSCH network is near capacity and that the child node may require prioritized access to ensure it can establish communications with the TSCH network. In other aspects, the child node may be a mobile device that requires short-term prioritized access. In additional aspects, the child node may be a low energy device (e.g., powered by a battery source or other energy source of limited energy capacity such as a super capacitor source). A low energy device child node may require prioritized access during instances where it has diminished battery life.

According to certain features described herein, a child node may request prioritized access to a parent node within communication range of the child node by including a priority request in an association request to the parent node. The priority request is implemented as a custom information element (IE) in the IEEE 802.15.4 and IEEE 802.15.4e communications between the child node and the parent node. For example, the child node may include an enabled priority bit in an application layer data packet for an association request. Upon receiving the prioritized association request, the parent node identifies the enabled priority bit and accepts or rejects the association request. If the parent node is already supporting the maximum number of child nodes, the parent node may temporarily suspend a previously connected child node to temporarily accept the requesting child node's prioritized association request for a short-term duration. The parent node responds to the association request by transmitting to the child node an association response indicating whether the association request is accepted or rejected.

To increase the likelihood of accepting the association request, the parent node is configured to accommodate prioritized associations. Specifically, a parent node accommodates prioritized association requests from child nodes by reserving one or more slots of its maximum slot capacity for child nodes requesting priority access. For example, the parent node maintains in memory a list of a limited number of entries (according to the maximum slot capacity) for connected child nodes. One or more of the limited number of entries are reserved for priority connections. For example, if the parent node is capable of supporting a maximum of 50 child nodes, the parent node may reserve five entries of the list of entries for child nodes requesting prioritized access. The number of slots reserved for child nodes requesting prioritized access is configurable and may be programmed into the parent node during initial network setup.

In some aspects, the priority request included in the association request transmitted by the child node may include a duration request for the priority. For example, the duration may be for a short-term duration or a long-term duration priority. In some aspects, the child node determines whether to include a duration request for short-term priority or long-term priority based on whether the number of parent nodes identified by network scans changes over a period of time. For example, if the number of available parent nodes identified as being within communication range of the child node increases from one network scan to the next network scan, this may indicate that the TSCH network is still in an initialization state and additional parent nodes may be available once the network matures. If the child node determines that the network is still initializing it requests prioritized access with a short-term priority duration request. If the number of available parent nodes identified as being within communication range of the child node remains the same after multiple network scans over a period of time, this may indicate that the network is mature. If the child node determines that the TSCH network is mature and that the number of identified parent nodes within communication range of the child node remains less than a threshold number of parent nodes, the child node requests prioritized access with a long-term priority duration request.

These illustrative examples are given to introduce the reader to the general subject matter discussed here and are not intended to limit the scope of the disclosed concepts. The following sections describe various additional aspects and examples with reference to the drawings in which like numerals indicate like elements.

Referring now to the drawings, FIG. 1 is a network diagram illustrating an example TSCH network 100 comprising TSCH nodes 102a-d communicatively coupled to a resource provider 110. The TSCH network 100 provides communications between child nodes 104a-d and the resource provider 110 via network 115. For example, network 115 may include any suitable network or intermediary computing devices, including private intranets or the Internet. Each of the TSCH nodes 102a-d may be parent nodes to one or more child devices 104a-d. For example, TSCH nodes 102b-d are shown as example parent nodes for child nodes 104a-d. The parent TSCH devices 102c-d can communicate with both the adjacent TSCH devices (e.g., TSCH devices 102b-c being adjacent to TSCH device 102d and TSCH devices 102b, 102d being adjacent to TSCH device 102c) and connected child nodes 104a-c via one or more radio transceivers.

The child nodes 104a-d can be used to perform one or more applications relating to managing, monitoring, or otherwise using information regarding one or more attributes of a power distribution system associated with the resource provider 110. Non-limiting examples of such child nodes 104a-d include an intelligent metering device for monitoring and analyzing power consumption, a programmable thermostat for managing power consumption, an in-home display device for displaying information related to power consumption and associated billing information for the power consumption, and the like. Child nodes 104a-d may be installed as intelligent metering devices within a home area network. Child nodes 104a-d also include other Internet-Of-Things enabled devices for providing smart home capabilities in a home area network. In some embodiments, child nodes 104a-d can also include mobile devices passing within the wireless range of more TSCH devices 102a-d in TSCH network 100.

The child nodes 104a-d may be A/C powered or in some embodiments powered by limited sources of power. For example, child nodes 104a-d may be battery powered or powered by super capacitors. Child nodes 104a-d when implemented as devices powered with limited power sources are referred to as low-energy devices and conserve battery life by periodically shutting down power to components (e.g., oscillators and transceivers) and cycling between a sleep state and a wake state. Child nodes 104a-d may operate on any suitable wireless network for communicating with each other and with the TSCH network 100 via TSCH nodes 102c, 102d. In other embodiments, a child node may be a TSCH node (e.g., a device operating on a TSCH protocol) requesting access to join the TSCH network. In some other embodiments parent nodes and child nodes may be operating on non TSCH network, for example 802.15.4 based Carrier Sense Multiple Access (CSMA) network.

As the child nodes 104a-d initialize or awaken from a sleep state, the child nodes 104a-d begin the synchronization process to associate with the TSCH network 100 by scanning for available TSCH nodes 102a-d within wireless communication range. In the example shown in FIG. 1, child node 104a is within wireless communication range 110a of both TSCH nodes 102b, 102d, while child nodes 104b, 104c are only within wireless communication range 110b of TSCH node 102d. In certain embodiments, child nodes 104a-d determine whether to transmit prioritized association requests during the association process with the TSCH network 100. Depending on the maximum available bandwidth, memory size, and hardware capabilities of the TSCH nodes 102a-d, the TSCH nodes 102a-d may support a limited number of child nodes at a time. Thus, the number of available TSCH nodes 102 decreases as the TSCH network 100 matures over time and increasing numbers of child nodes 104 associate with the TSCH nodes 102. A child node 104 requesting association with the TSCH network 100 may request prioritized association with a parent node if a limited number of available TSCH nodes 102 (e.g., less than a threshold number) are detected by the child node 104.

For purposes of example, assume TSCH nodes 102b, 102d have a maximum child node slot capacity of two child slots. Also assume that child nodes 104b-c have associated with and joined TSCH node 102d at a point in time before child node 104a initializes. As child node 104a initializes and begins the network association process, child node 104a scans for available parent nodes by cycling through frequency channels utilized by the TSCH network 100 and listening for communications from TSCH devices. Even though TSCH node 102d is within communication range of child node 104a, child node 104a only identifies TSCH node 102b as an available parent node because TSCH node 102d is already supporting the maximum number of child nodes.

Child node 104a determines the number of available TSCH nodes 102 and further determines that the number of available TSCH nodes 102 (in this example one available TSCH node 102b) is less than a threshold number of available parent nodes. The threshold number of available parent nodes that triggers a prioritized association request from a child node 104 may be a configurable value programmed into the child node 104 before initialization and modified during runtime.

Figure 2:
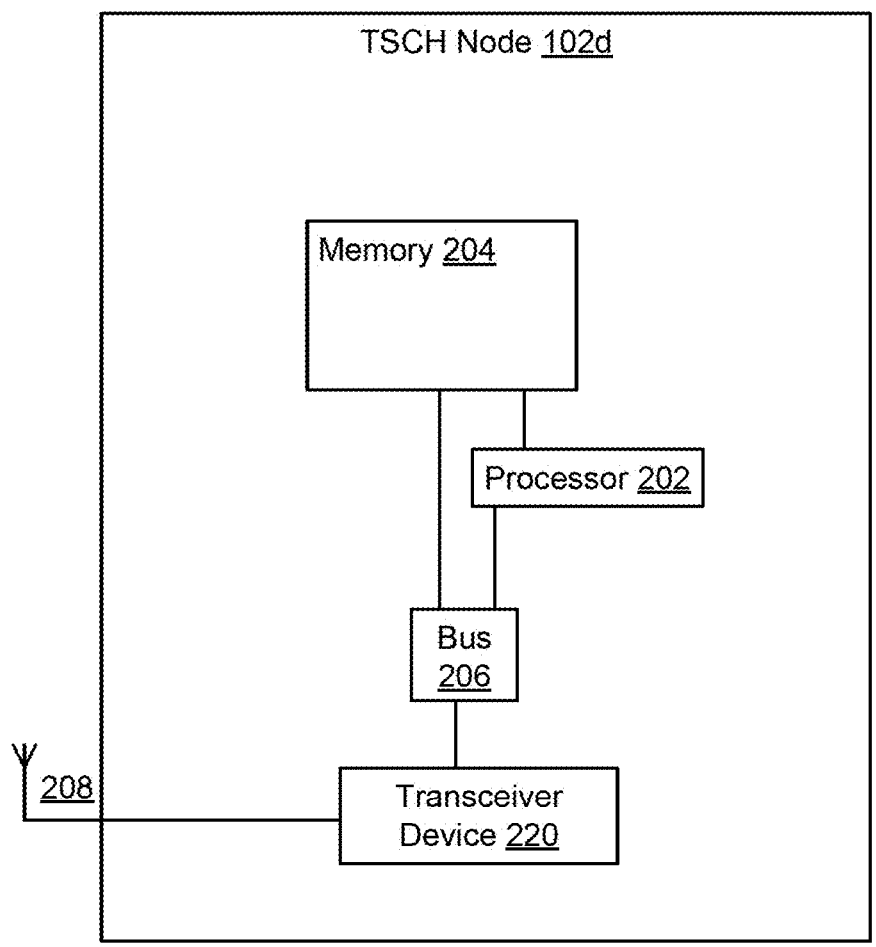
FIG. 2 is a block diagram illustrating an example of a TSCH parent node.

FIG. 2 is a block diagram illustrating an example of a TSCH node 102d with a single transceiver device 220 for communicating with both adjacent TSCH nodes 102b, 102c and connected child nodes 104b-c. The TSCH node 102d includes a processor 202. Non-limiting examples of the processor 202 include a microprocessor, an application-specific integrated circuit (ASIC), a state machine, a field programmable gate array (FPGA) or other suitable processing device. The processor 202 can include any number of processing devices, including one. The processor 202 can be communicatively coupled to non-transitory computer-readable media, such as memory device 204. The processor 202 can execute computer-executable program instructions and/or access information stored in the memory device 204.

The memory device 204 can store instructions that, when executed by the processor 202, causes the processor 202 to perform operations described herein. The memory device 204 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The TSCH node 102d can also include a bus 206. The bus 206 can communicatively couple one or more components of the TSCH node 102. Although the processor 202, the memory device 204, and the bus 206 are respectively depicted in FIG. 2 as separate components in communication with one another, other implementations are possible. For example, the processor 202 the memory device 204, and the bus 206 can be respective components of respective printed circuit boards or other suitable devices that can be disposed in TSCH node 102d to store and execute programming code.

The TSCH node 102d also includes a transceiver device 220 communicatively coupled to the processor 202 and the memory device 204 via the bus 206. Non-limiting examples of a transceiver device 220 include an RF transceiver and other transceivers for wirelessly transmitting and receiving signals. The transceiver device 220 is used by the TSCH node 102 to communicate with adjacent TSCH nodes 102b, 102c and connected child nodes 104a-b via antenna 208. In some embodiments, the transceiver device 220 is capable of implementing multiple MAC interfaces by utilizing multiple antennas to communicate with both adjacent TSCH nodes 102b, 102c and connected child nodes 104b-c. The TSCH node 102d can communicate with adjacent TSCH nodes 102b-c and the child nodes 104a-b using a single transceiver device 220 via the same or differing network protocols. For example, the TSCH node 102d can communicate with a child node 104 when running on battery power and can be configured to operate using a low-energy TSCH protocol, in which the child node 104 switches frequency channels at a slower rate compared to the channel hopping pattern used by the TSCH network 100. The TSCH node 102d may communicate with both adjacent TSCH nodes 102b-c and connected child nodes 104b-c even if the TSCH node 102 and the child node 104 use different frequencies. In other embodiments child node and TSCH node can communicate on the same frequencies.

While TSCH node 102d is shown with a single transceiver device 220 for exemplary purposes, in some embodiments, the TSCH node 102d may include multiple transceiver devices. For example, in embodiments where the TSCH network 100 is operating on a different set of frequencies or modulation techniques than connected child nodes 104a-b, the TSCH node 102 may include multiple transceiver devices to communicate using different modulation techniques. For example, a first transceiver device (configured for a first set of frequencies or modulation techniques) may be used for communication with the adjacent TSCH nodes 102b, 102c and a second transceiver device (configured for a second set of frequencies or modulation techniques) may be used for communication with the child nodes 104b-c.

Figure 3:
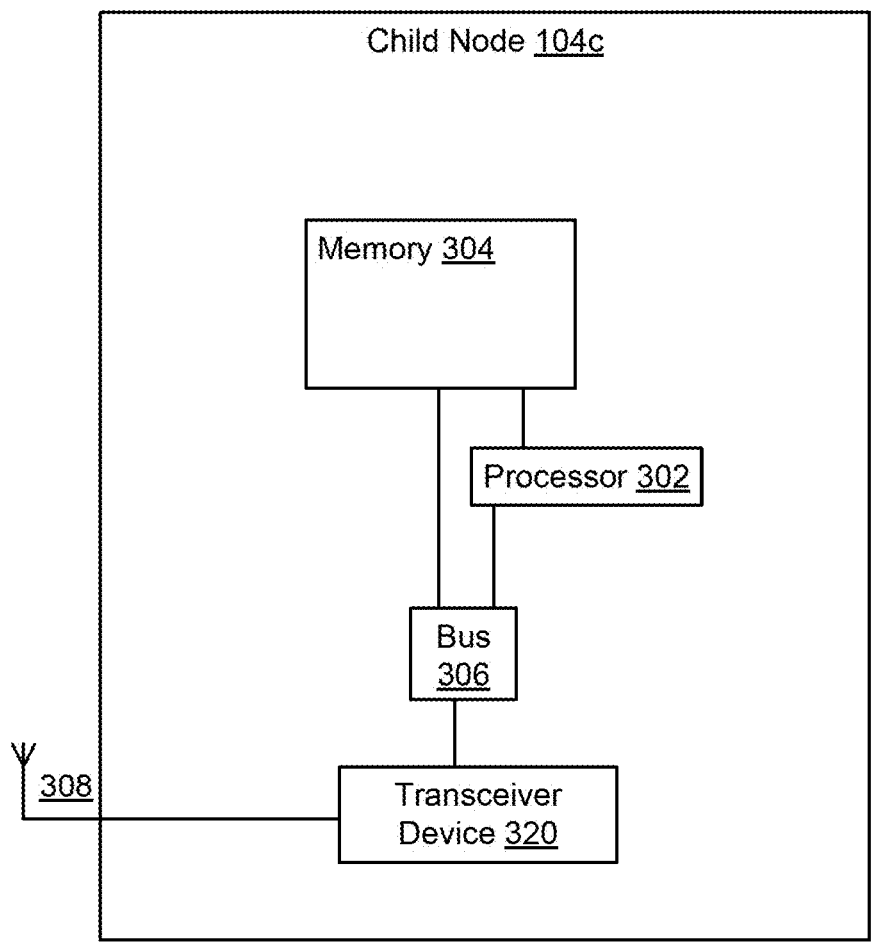
FIG. 3 is a block diagram illustrating an example of a child node.

FIG. 3 is a block diagram illustrating an example of a child node 104c for communicating with parent node 102d. The child node 104c includes a processor 302, memory 304, transceiver device 320, all interconnected via bus 306. Processor 302, memory 304, transceiver device 320, and bus 306 perform operations similar to those described above with respect to FIG. 2. In embodiments where child node 104c is battery powered, the memory 304, processor 302, bus 306, and transceiver device 320 are powered by a battery (not shown).

As mentioned above, the TSCH network 100 utilizes a TSCH protocol to communicate wireless information within the network and outside the network. In a TSCH network, devices within the network are synchronized according to a TSCH channel hopping pattern. In embodiments where TSCH nodes 102a-d and child nodes 104a-d operate on different networks or protocols, the TSCH nodes 102a-d can alternate communication periods between the TSCH network 100 and the child nodes 104a-d by sub-dividing TSCH timeslots. Exemplary techniques for alternating communication periods between the primary TSCH network 100 and the network utilized by the child nodes 104a-d by sub-dividing TSCH timeslots are described in U.S. Pending patent application Ser. No. 14/830,271, titled "Interleaved Communication With Resource Providers And A Home Area Network", the contents of which are incorporated by reference herein.

Figure 4:
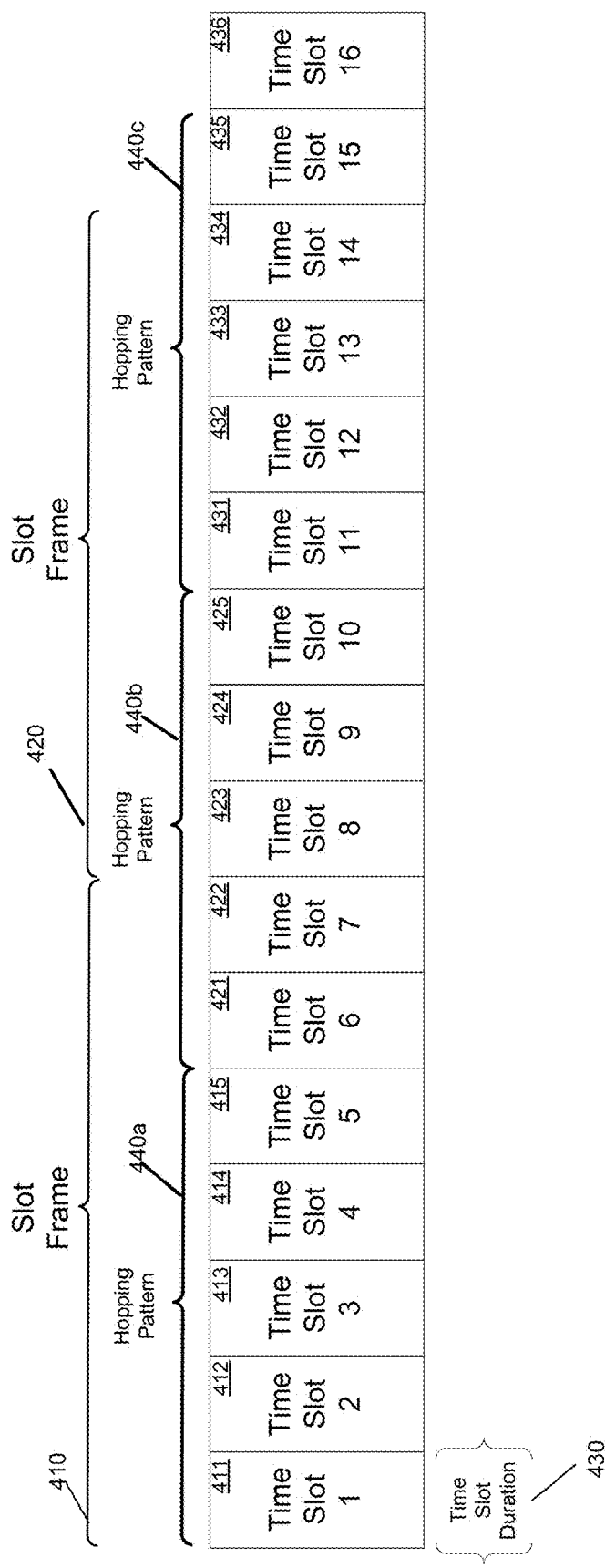
FIG. 4 is a diagram illustrating the arrangements of timeslots in a time slotted channel hopping pattern.

Each timeslot in a TSCH network 100 is of a time duration of duration "T" which can be defined in milliseconds or other appropriate time unit. A TSCH network also uses multiple channel frequencies for communication between devices in the network. A hopping pattern defines the channel used to communicate during each timeslot. FIG. 4 is a diagram illustrating timeslots and channel hopping pattern for a TSCH network following a TSCH protocol. FIG. 4 illustrates timeslots 411-415, 421-425, and 431-436, each with the same timeslot duration 430. As an example, timeslot duration 430 can be 25 milliseconds. Each slot frame 410 and 420 includes seven timeslots. FIG. 4 also illustrates the channel hopping pattern 440 (shown as channel hopping patterns 440a-c). A channel hopping pattern defines a channel frequency or channel for each timeslot in the hopping pattern. For example, the hopping pattern 440a may be channel 4, channel 6, channel 3, channel 5, channel 7, i.e., it may associate channel 4 with timeslot 1, channel 6 with timeslot 2, channel 3 with timeslot 3, channel 5 with timeslot 4, and channel 7 with timeslot 5. In FIG. 4 the hopping pattern 440a has a hopping pattern length of 5. The hopping pattern repeats. The first illustrated iteration of the hopping pattern 440a contains timeslots 1-5 (411-415), the second iteration of the hopping pattern 440b contains timeslots 6-10 (421-425), and the third iteration of the hopping pattern 440c contains timeslots 11-15 (431-435). The number of timeslots in a hopping pattern is independent of the number of timeslots in a slot frame.

Figure 5:
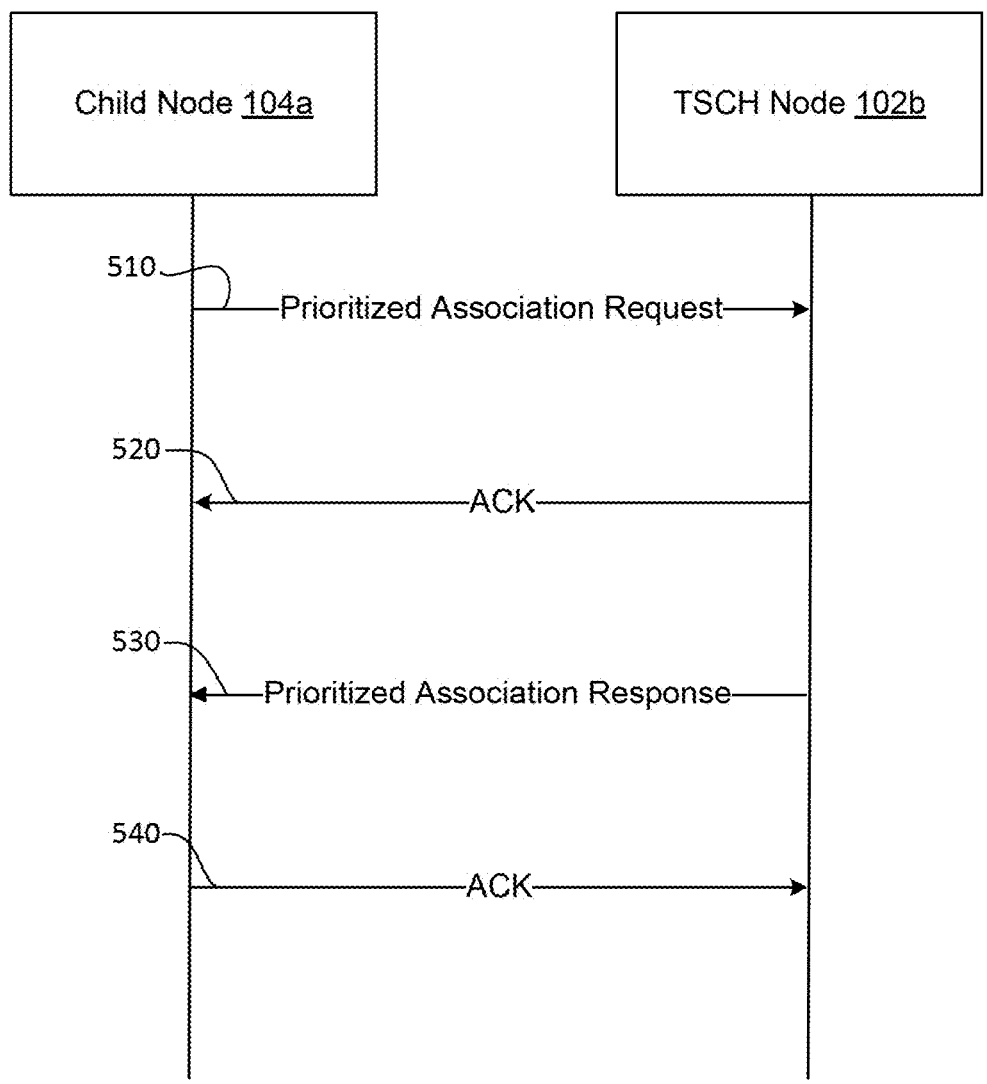
FIG. 5 is a communication timing diagram depicting the sequence of messages transmitted between a child node and a TSCH node for establishing prioritized association.

FIG. 5 illustrates a communication timing diagram between a child node 104a and a TSCH node 102b of a TSCH network 100 for establishing prioritized association. The communication timing in FIG. 5 is intended to illustrate the sequence of messages that are transmitted between child node 104a and TSCH node 102b when establishing prioritized association.

To associate with the TSCH network 100, upon determining that an association request should include a priority request, the child node 104a transmits a prioritized association request to TSCH node 102b during a first time period 510. In response, the TSCH node 102b transmits an acknowledgment message to child node during a second time period 520. If the child node 104a does not receive the acknowledgment message within a threshold time period, the child node 104a may retransmit the prioritized association request. As explained further below with respect to FIG. 7, the TSCH node 102b determines whether to accept or deny the prioritized association request and transmits a prioritized association response 530 to the child node 104a during a third time period 530. The prioritized association response indicates whether the TSCH node 102b accepted or denied the association request.

Note that while the acknowledgment message from the TSCH node 102b and the prioritized association response are shown as being transmitted as separate communications during a second time period 520 and a third time period 530, respectively, the prioritized association response and the acknowledgment message may in some aspects be combined as a single message and transmitted to the child node 104a.

Upon receiving the prioritized association response, the child node 104a transmits an acknowledgment message to the TSCH node 102b during a fourth time period 540. If the TSCH node 102b does not receive the acknowledgment message within a threshold time period, the TSCH node 102b may retransmit the prioritized association response. Subsequently, if the TSCH node 102b accepted the association request, the child node 104a and TSCH node 102b begin the association and joining procedure defined in IEEE 802.15.4 or IEEE 802.15.4e.

Figure 6:
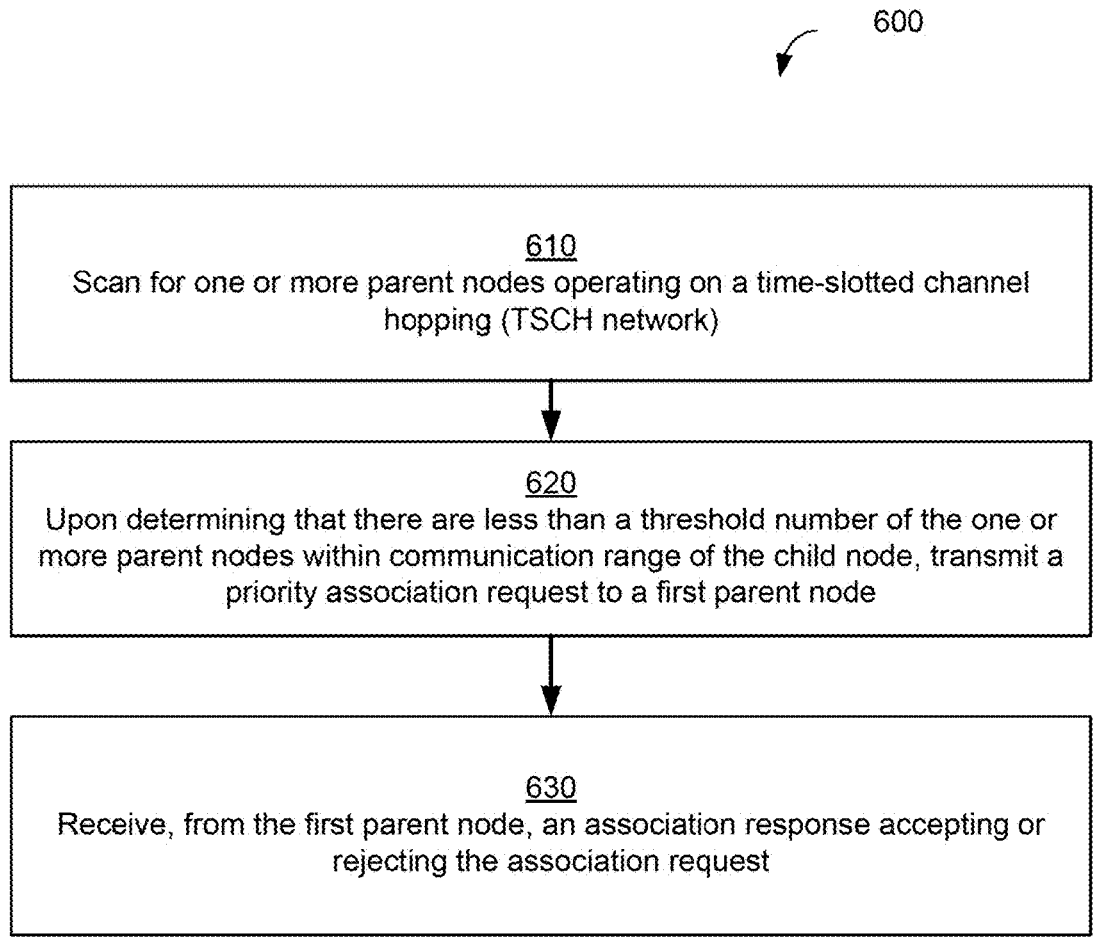
FIG. 6 is a flowchart depicting an example process executed at a child node for establishing prioritized association with a TSCH parent node.

FIG. 6 is a flowchart illustrating an example method 600 executed by a child node 104a to initiate a prioritized association request to connect with a TSCH node 102b. For illustrative purposes, the method 600 is described with reference to the system implementations depicted in FIGS. 1-3 and with regards to the TSCH timeslot illustrations shown in FIG. 4. Other implementations, however, are possible.

As shown in block 610, the process 600 includes scanning for one or more available parent nodes on a TSCH network. For example, upon boot up initialization or upon waking from a sleep state, the child node 104a scans for available TSCH parent nodes 102b, 102d within communication range of the child node 104a. The scan is performed by listening for communications from nearby TSCH parent devices 102b, 102d by cycling through different frequency channels used by the TSCH network 100. TSCH parent devices intermittently broadcast beacon signals indicating availability. The beacon signals can also include information indicating if a TSCH parent device is accepting new child nodes. The child node 104a may determine that TSCH parent devices 102b, 102d are available by listening for the beacon signals.

The child node may determine whether priority access to a parent node is needed depending on the number of available TSCH parent nodes 102b, 102d found by the scan. For example, if the child node identifies a threshold number of available TSCH parent nodes are within communication range of the child node, the child node determines that prioritized access is not needed. If the child node identifies less than a threshold number of parent nodes within communication range, the child node determines that prioritized access is needed.

In some aspects, a child node 104a identifies the number of TSCH parent devices 102b, 102d within communication range and determines whether a prioritized association request is required based on the number of identified TSCH parent devices 102b, 102d, regardless of the availability of the parent devices. For example, a child node 104a scans for nearby TSCH parent devices 102b, 102d by scanning or communications from nearby TSCH devices 102a-d by cycling through different frequency channels used by the TSCH network 100. The child node 104a, in this example, does not make a determination as to whether the identified parent devices 102a-d are available but identifies nearby parent devices 102b, 102d. The child device 104a determines whether to transmit a prioritized request if the number of identified parent devices 102b, 102d within communication range of the child node 104a is less than a threshold number.

Upon determining that there is less than a threshold number of TSCH parent nodes 102b, 102d within communication range of the child node 104a, the child node transmits a priority association request to a first parent node 102b of the one or more parent nodes 102b, 102d, as shown in block 620. For example, upon determining that there is less than a threshold number of TSCH parent nodes 102b, 102d, the child node 104a may include a priority request in the form of an enabled bit in the data frame that carries the association request. The threshold number that determines whether the priority request is included may be programmed into the child node 104a before network deployment and configured once the child node 104a is installed.

In some aspects, the association request includes a duration request for short-term priority or long-term priority. A short-term priority request indicates priority that is requested for a limited duration of time (e.g., a duration of time necessary to complete a single communication event between the TSCH node 102b and the child node 104a). For example, a short-term priority request allows the child node 104b to associate with the TSCH parent node 102a for a specific event or task, such as reporting power current consumption metrics to the TSCH parent node 102b. After completion of the data communication, the child node 104a disassociates from the TSCH parent node 102b. A long-term priority request indicates priority that is requested for as long as the TSCH parent node 102b is operational and powered and until the child node 104a requests disassociation from the TSCH parent node 102b.

The child node 104a determines whether to include a short-term duration request or a long-term duration request with the prioritized association request based on one or more conditions in the TSCH network 100 detected by the child node 104a. For example, the child node 104a may determine whether to include a short-term duration request or a long-term duration request based on whether the child node 104a determines that the TSCH network 100 is in an initialization state or a mature state.

A TSCH network 100 in an initialization state indicates that the TSCH network 100 is still being initialized as TSCH nodes 102a-d power on, connect with and synchronize with adjacent TSCH nodes 102a-d, and broadcast beacon transmissions advertising availability for listening child nodes 104a-d. A child node 104a may determine that the TSCH network 100 is in an initialization state by comparing the number of available TSCH nodes 102a-d detected as being within communication range over a threshold period of time. For example, if the child node 104a determines via multiple network scans that the number of available TSCH nodes 102a-d has increased over a threshold period of time, the child node 104a determines that the TSCH network 100 is still in an initialization state because TSCH nodes 102a-d are still in the process of powering on and synchronizing with the TSCH network 100. Upon determining that the TSCH network 100 is in an initialization state (and upon determining that the number of available TSCH parent nodes 102b, 102d is less than a threshold number as discussed above with respect to block 620), the child node 104a includes a prioritized association request with a duration request for short-term priority.

A TSCH network 100 in a mature state indicates that the TSCH network 100 includes a steady number of TSCH nodes 102a-d that are operational over a threshold period of time (the value for the threshold period of time being a programmable adjustment for the child node 104). For example, if the child node 104a determines via multiple network scans that the number of available TSCH nodes 102b, 102d remains constant over the threshold period of time, the child node 104a determines that the TSCH network 100 is in a mature state because new TSCH nodes 102b, 102d are no longer being detected. Upon determining that the TSCH network 100 is in a mature state (and upon determining that the number of available TSCH parent nodes 102b, 102d is less than a threshold number as discussed above with respect to block 620), the child node 104a includes a prioritized association request with a duration request for long-term priority.

Other conditions may also cause the child node 104a to transmit a duration request for short-term priority. For example, in some aspects, the child node 104a may comprise a mobile device entering within range of one or more TSCH nodes 102a-d of TSCH network 100. In such an example, the mobile device may need short-term access to a TSCH node 102b within communication range so that the TSCH node 102b can route communications from the mobile device to an external network. If the mobile device determines that a prioritized association request is needed, the mobile device may include a duration request for short-term priority. In other aspects, the child node 104a may operate on battery power and transmit a duration request for short-term priority when the child node 104a is low on battery. In other aspects, the child node 104a may transmit a duration request for short-term priority if the child node 104a has alarm application data that it needs to transmit.

In some aspects, the child node 104a may transmit an association request with a short-term duration request without requesting priority. For example, upon determining, by a network scan, that there are less than a threshold number of TSCH parent nodes 102b, 102d within communication range of the child node 104a, the child node 104a may transmit an association request for short-term duration but without priority. In one example, the child node 104a may transmit an association request for short-term duration without priority when the child node 104a needs to join with any of the parent nodes 102b, 102d and association with a specific parent node is not required. If the child node 104a needs to connect to a particular parent node 102b, 102d, the child node 104a can transmit an association for short-term duration with priority.

The process 600 further includes receiving, from the parent node 102b, an association response accepting or rejecting the association request, as shown in block 630. An association response accepting the association request indicates that the TSCH parent node 102b included the child node 104a in its connection list of nodes. Upon receiving the association response accepting the request, the child node 104a and the TSCH node 102b begin the synchronization process for synchronizing the child node 104a to the TSCH network 100. If the child node 104a receives an association response rejecting/denying the association request, the child node 104a transmits the prioritized association request to the next available TSCH node 102d within communication range of the child node 104a.

If the child node 104a had requested short-term association with the parent node 102b, as discussed above with respect to block 620, the child node 104a disconnects/disassociates from the parent node 102b upon completing a communication with the parent node 102b (e.g., after completing transmission or receipt of a communication message regarding an event, such as reporting of the power consumption of a monitored home area network).

Figure 7:
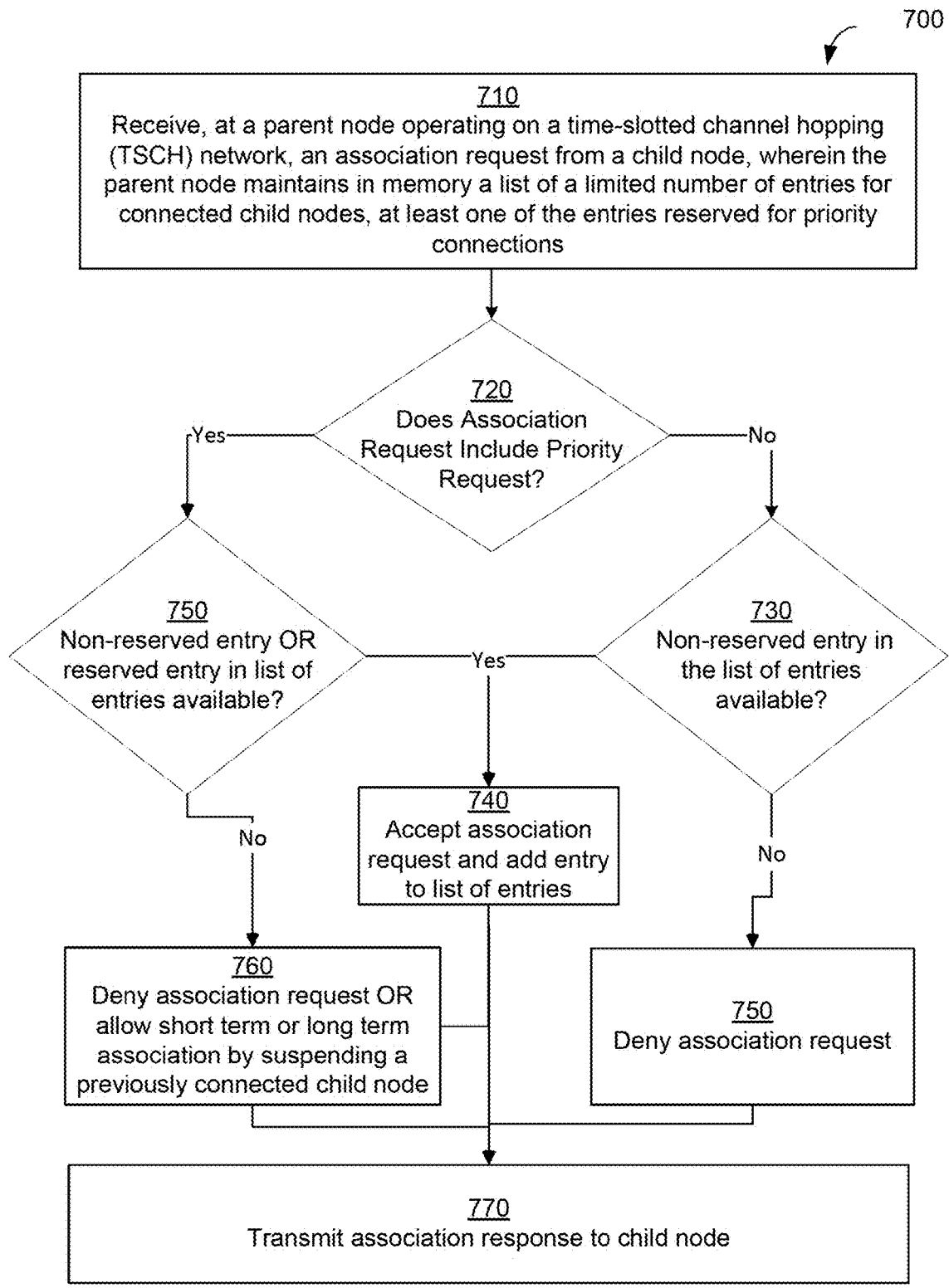
FIG. 7 is a flowchart depicting an example process executed at a TSCH parent node for establishing prioritized association with a child node.

FIG. 7 is a flowchart illustrating an example process 700 executed by a parent node 102d to receive and process an association request from a child node 104b, with support for prioritized association requests. For illustrative purposes, the method 700 is described with reference to the system implementations depicted in FIGS. 1-3 and with regards to the TSCH timeslot illustrations shown in FIG. 4. Other implementations, however, are possible.

The process 700 includes receiving, at a TSCH parent node 102d operating on a TSCH network 100, an association request from a child node 104b, as shown in block 710. The TSCH parent node 102d maintains in memory 204 a list of entries for connected child nodes. The number of entries is limited according to the maximum slot capacity for the TSCH parent node 102d (i.e. the maximum number of child nodes the parent node 102d may support at a time). To accommodate prioritized association requests, the TSCH parent node 102d reserves at least one entry of the limited number of entries for priority association requests from child nodes 104a-d. Thus, a first set of entries of the limited number of entries is used by the TSCH node 102d for association requests that are received with or without priority requests. A second set of the limited number of entries is reserved by the TSCH node 102d for association requests that are received with priority requests. As child nodes 104b-c associate and join with TSCH node 102d, the TSCH node 102d populates the list of entries with each associated child node 104b-c until the maximum number of child nodes 102d are supported. In some other implementations, the TSCH node 102d may not reserve any entry for priority requests. In this case, the TSCH node 102d, upon receiving the priority request, may choose to drop an already joined child node based on one or more parameters (e.g., last received packet time, lowest signal strength, among others).

The record in memory 204 may be implemented as any suitable software table or database to store information on the list of connected child nodes. For example, the record may include information such as identifiers (e.g., IP address or MAC address) for the child nodes 104b-c that are supported by the TSCH node 102, whether the child nodes 104b-c requested priority associations and if so, the duration of the priority requests.

The process 700 further includes determining whether the association request includes a priority request, as shown in block 720. For example, the TSCH parent node 102d processes the incoming association request packet and identifies the priority enabled bit indicating that the child node 104b requested priority association.

If the association request does not include a priority request, the TSCH node 102d determines whether there is a non-reserved entry among the list of the limited number of entries available, as shown in block 730. An available non-reserved entry indicates that the TSCH node 102d is capable of supporting an additional child node without priority requests. If the TSCH node 102d determines that there are no non-reserved entries available (i.e. all non-reserved entries in the list of limited entries are full with connected child nodes 104b-c), the TSCH node 102 denies the association request, as shown in block 750. If the TSCH node 102d determines that there is at least one available entry not reserved for prioritized association requests, the TSCH node 102d accepts the association request, as shown in block 740. The TSCH node 102d further adds information on the child node 104b that transmitted the association request to the available entry.

If the association request includes a priority request, the TSCH node 102d determines whether there is a non-reserved entry or a reserved entry (i.e. reserved for child nodes 104a-d with prioritized association requests) from the list of the limited number of entries available, as shown in block 750. If there is an available entry, the TSCH node 102d accepts the prioritized association request and adds information on the child node 104b requesting prioritized association to the list of entries of connected child nodes. In some aspects, the TSCH node 102d accepts the prioritized association request for a long-term association (i.e. as long as the TSCH node 102d remains operational). In some situations, the TSCH node 102d may have multiple available connection slots (i.e. multiple non-reserved entries available in the list of entries). In these aspects, if the prioritized association request from the child node 104b includes a duration request for long-term priority, the TSCH node 102d includes information on the child node 104b in a non-reserved entry. If the prioritized association request from the child node 104b includes a duration request for short-term priority, the TSCH node 102d includes information on the child node 104b in a reserved entry of the reserved child list. However, other implementations are also possible.

If there are no entries available, indicating that the TSCH node 102d is supporting the maximum number of child nodes 104b-c, the TSCH node 102d may deny the association request or allow short term association or long term association based on the duration request by suspending the association of a previously connected child node 104b, 104c, as shown in block 760. The TSCH node 102d continues to associate child nodes that are transmitting association requests with priority while suspending previously connected child nodes that are connected without priority until a threshold number of prioritized associations is achieved.

The threshold number is configurable by a network administrator via configuration of the TSCH node 102d. Upon associating a threshold number of prioritized child nodes, the TSCH node 102d denies subsequent association requests from additional child nodes.

For example, referring to FIG. 1, child node 104b may be a previously connected child node that has already associated with TSCH node 102d. If TSCH node 102d receives an association request with a priority request from child node 104c, the TSCH node 102d may deny the association request or temporarily suspend the association of child node 104b in order to allow for short-term association of child node 104c. The TSCH node 102d temporarily removes child node 104b from the list of reserved entries and adds the child node 104c to the list of reserved entries for a short-term duration (e.g., for a duration of time that allows the child node 104c to complete a single communication event).

In some aspects, the TSCH node 102d may change the priority duration setting of connected child nodes 104b, 104c based on network conditions. For example, in some situations a first connected child node 104b (connected via prioritized association with a long-term duration request) may have left communication range and not communicated with the TSCH node for a threshold amount of time. In such aspects, if a second connected child node 104c attempts to associate with the TSCH node 102d with prioritized association, the TSCH node 102d may change the priority duration setting of the first connected child node 104b. The threshold amount of time is configurable by a network administrator.

The process 700 further includes transmitting, from the TSCH node 102d, an association response to the child node 104b, 104c that requested the association. The association response indicates whether the association request from the child node was accepted or rejected/denied along with information indicating the reason for the rejection (e.g., network at capacity, etc.).

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art

The invention claimed is:

1. A method executed by a child node initiating an association request to connect with a parent node operating on a time-slotted channel hopping (TSCH) network, the method comprising:
   scanning, by a child node, for one or more available parent nodes on a TSCH network;
   upon determining that there is less than a threshold number of the one or more available parent nodes within communication range of the child node, transmitting an association request to a first parent node among the one or more available parent nodes, the association request including a priority request that identifies the association request as having a higher priority; and
   receiving, from the first parent node, an association response accepting or rejecting the association request.

2. The method of claim 1, wherein the association request includes a duration request for short-term priority or long-term priority.

3. The method of claim 2, wherein the association request includes the duration request for short-term priority upon determining, by the child node, that the TSCH network is in an initialization state by determining that the threshold number of parent nodes has increased over a threshold time period.

4. The method of claim 2, wherein the association request includes the duration request for long-term priority upon determining, by the child node, that the TSCH network is in a mature state by determining that the threshold number of parent nodes has not changed over a threshold time period.

5. The method of claim 2, wherein the child node comprises a mobile device temporarily within communication range of the one or more parent nodes of the TSCH network, and wherein the association request includes the duration request for short-term priority.

6. The method of claim 5, wherein the association request includes the duration request for short-term priority upon determining, by the child node, that the child node is low on battery power.

7. The method of claim 1, wherein the association response received by the child node rejects the association request, and the method further comprising:
   transmitting the association request to a second parent node among the one or more available parent nodes, the association request including the priority request.

8. The method of claim 1, wherein the one or more available parent nodes comprise routing devices for providing communications between the child node and a utility resource provider.

9. A child node, comprising:
   a processor; and
   a non-transitory computer-readable medium, wherein the processor is configured for executing instructions embodied in the non-transitory computer-readable medium to perform operations comprising:
      scanning, by the child node, for one or more available parent nodes operating on a time-slotted channel hopping (TSCH) network;
      upon determining that there is less than a threshold number of the one or more available parent nodes within communication range of the child node, transmitting an association request to a first parent node among the one or more available parent nodes, the association request including a priority request that identifies the association request as having a higher priority; and
      receiving, from the first parent node, an association response accepting or rejecting the association request.

10. The child node of claim 9, wherein the association request includes a duration request for short-term priority or long-term priority.

11. The child node of claim 10, wherein the association request includes the duration request for short-term priority upon determining, by the child node, that the TSCH network is in an initialization state by determining that the threshold number of parent nodes has increased over a threshold time period.

12. The child node of claim 10, wherein the association request includes the duration request for long-term priority upon determining, by the child node, that the TSCH network is in a mature state by determining that the threshold number of parent nodes has not changed over a threshold time period.

13. The child node of claim 10, wherein the child node comprises a mobile device temporarily within communication range of the one or more parent nodes of the TSCH network, and wherein the association request includes the duration request for short-term priority.

14. The child node of claim 9, wherein the association response received by the child node rejects the association request, and the method further comprising:
transmitting the association request to a second parent node among the one or more available parent nodes, the association request including the priority request.

15. The child node of claim 9, wherein the one or available more parent nodes comprise routing devices for providing communications between the child node and a utility resource provider.

16. A method, comprising:
receiving, by a parent node operating on a time-slotted channel hopping (TSCH) network, an association request from a requesting child node for connecting with the parent node, the association request including a priority request that identifies the association request as having a higher priority, wherein the parent node maintains in memory a list of a limited number of entries for connected child nodes, and wherein the parent node reserves at least one entry of the limited number of entries for priority connections;
upon determining, by the parent node, that the association request includes the priority request, accepting the association request for a short-term association or for a long-term association depending on whether the list of the limited number of entries for connected child nodes is full, wherein the association request is accepted by adding an identifier identifying the requesting child node to the at least one entry of the limited number of entries for priority connections; and
transmitting, to the requesting child node, an association response indicating whether the association request was accepted or rejected.

17. The method of claim 16, wherein the association request includes a duration request for short-term priority or long-term priority.

18. The method of claim 17, wherein the parent node is one of a plurality of TSCH nodes providing communications between a utility resource provider and a plurality of child nodes installed in one or more home area networks, wherein the requesting child node is one of the plurality of child nodes.

19. The method of claim 18, further comprising:
determining that the limited number of entries for connected child nodes is full; and
suspending an association of a previously connected child node, wherein the priority association request from the requesting child node is accepted for the short-term association or long term association.

20. The method of claim 19, wherein the short-term association is for a duration of time necessary to complete a communication event between the requesting child node and the parent node.

21. The method of claim 20, further comprising disassociating the requesting child node upon completion of the communication event.

22. The method of claim 20, further comprising:
determining that the limited number of entries for connected child nodes is not full, wherein the association request from the requesting child node is accepted for the long-term association.

* * * * *